United States Patent [19]

Legge

[11] Patent Number: 4,633,555
[45] Date of Patent: Jan. 6, 1987

[54] METHOD FOR CUTTING TUBE-WALLS

[76] Inventor: Gerald A. Legge, R.R. #3, Box 342, Aurora, Ind. 47001

[21] Appl. No.: 721,581

[22] Filed: Apr. 10, 1985

[51] Int. Cl.$^4$ .................. B21D 53/02; B23P 6/00; B23P 15/26; B26D 5/08
[52] U.S. Cl. ................. 29/157.4; 29/157.3 R; 29/402.09; 29/402.11; 29/402.16; 29/726; 83/54; 83/471; 83/473; 83/523; 83/578; 83/821
[58] Field of Search ............ 29/402.11, 402.09, 157.4, 29/157.3 R, 402.16, 726; 165/168, 169, 186; 83/54, 162, 701, 471, 472, 473, 523, 578, 821

[56] References Cited

U.S. PATENT DOCUMENTS

| | | |
|---|---|---|
| 1,932,462 | 8/1932 | Howlett . |
| 2,291,395 | 12/1939 | Levey . |
| 2,561,484 | 8/1949 | Shaw et al. . |
| 2,589,554 | 3/1952 | Killian . |
| 2,818,892 | 1/1958 | Price . |
| 2,921,492 | 1/1960 | Worth . |
| 2,973,576 | 3/1961 | Hentke . |
| 3,166,620 | 1/1965 | Galezniak . |
| 3,279,059 | 10/1966 | Keiter . |
| 3,704,516 | 12/1972 | Ono . |
| 4,091,699 | 5/1978 | Chaze et al. . |
| 4,095,495 | 6/1978 | Chaze et al. . |
| 4,181,054 | 1/1980 | Striebig ............ 83/471.3 X |
| 4,320,566 | 3/1982 | Boyer ............. 29/402.9 |

FOREIGN PATENT DOCUMENTS 7607516 7/1976 Netherlands ............ 29/402.11

OTHER PUBLICATIONS

Setco Mach-Mate Building Blocks Catalog (1974), p. 4.
F & M Catalog, VU-160 Universal Cutting Machine, p. 270.

Primary Examiner—Howard N. Goldberg
Assistant Examiner—R. S. Wallace
Attorney, Agent, or Firm—Wood, Herron & Evans

[57] ABSTRACT

A method and apparatus for cutting a boiler tube-wall of a power generating station comprised of a plurality of generally parallel, vertical tubes welded together lengthwise, the method employing a guide having a pair of parallel guide rods interposed between a pair of securement devices for selectively, removably securing the guide to the tube-wall and a mount slidably mounted on the guide rods for movably supporting an actuatable tool for movement along the guide rods between the securement devices, the method comprising the steps of:

(a) mounting a cutting tool to the mount;
(b) removably securing the guide to a first location on one vertical surface of the tube-wall, the location being defined by a first line of cut to be made in the tube-wall;
(c) actuating the cutting tool; and
(d) moving the cutting tool along the guide rods between the securement devices and along the first cut line to cut through the tube-wall and any of the tubes therealong.

32 Claims, 6 Drawing Figures

METHOD FOR CUTTING TUBE-WALLS

BACKGROUND OF THE INVENTION

I. Field of the Invention

This invention relates to a method of cutting boiler tube-walls of a power generating station. Specifically, the present invention relates to such a method and to an apparatus therefor.

II. Description of the Prior Art

A typical power generating station includes one or more generating boilers to generate steam to turn the turbines. Generating boilers are of rather large construction, often reaching several tens of feet in height and involving several hundreds of cubic feet of space. A generating boiler is typically a looge steel building-like structure wherein the interior of the steel or brick walls are lined by tube-walls to define a massive interior space. The hollow interior is filled with heat-generating material such as burning coal and the like. The tube-walls of the boiler are formed of hundreds of long, generally vertical tubes (e.g. two-inch tubes) which are welded together with long, narrow ⅜ or ⅝ inch) strips of steel membrane or web to form a sealed container. A typical boiler may include as many as 1400 such tubes. Water is pumped through the tubewalls and heated by the burning coal within the building. The heated water is utilized to generate electricity by turning turbines, for example.

Occasionally, some of the tubes will require replacement. Typically, repair involves more than merely repairing or replacing the defective tube. Rather, it is necessary to cut out an entire section of the tube-wall and replace it with a new section of tube-wall. The section of the wall to be removed is measured and a new panel of tube-wall may be built to fit those precise dimensions. Once the new panel is available, the old portion of tube-wall containining the defective tubes is cut out and removed and the new panel placed into the tube-wall and welded in about its periphery.

The portion to be removed may be several feet long and several feet wide. For example, a rectangular portion to be removed might be defined as the area between two parallel seams involving 48 tubes (and their intervening seams) in width and, say, 20 feet in length (or height). To remove that section of tube-wall, several men using hand-held power saws would cut two parallel spaced-apart horizontal lines through the tube-wall. Those two cuts would bisect the 48 tubes and the intervening seams along the bottom and the top of the panel to be removed. The vertical seams on either side of the panel would be cut with a torch.

The use of hand-held power saws is both time-consuming and very inaccurate leading to timeconsuming and costly rework to fit the new panel. As an example, it takes approximately 33 man-minutes to cut through a two-inch diameter tube with a hand-held power saw. Accordingly, in excess of 48 man-hours would be required to make the two horizontal cuts through the tubes in a panel of 48 tubes.

Typical of hand-held power saws used for this prior method is a tool referred to as a "Rockwell 90" which is relatively small and uses a small 3 or 4 inch cutting disc. The small disc may wobble as it cuts. Further, the workman is likely to veer from the intended cut-line from time to time because of the limitations inherent in the use of small hand tools. As a result, the cut-line is not straight but has hills and valleys. These hills and valleys must be removed or built-up, respectively, to mate the new panel with the remaining tube-wall.

The curative steps involved in removing or building-up the tube-wall are very time-consuming, costly and prone to error. For example, a valley would require the use of a small insert referred to as a dutchman. The dutchman must be welded in place between the tube-wall and the new panel. These added welds take time and increase the chances for making a defective weld. Defective welds would result in rejection of the work by the owner (e.g. the power company) and, hence, costly re-work to correct the error. Additionally, the time consumed in cutting, removing, inserting and re-working tube-walls is precious as the power company is likely to be operating at reduced capacity while that generating boiler is being serviced.

A further drawback to the use of hand-held power saws is that the cutting discs wear out frequently. As a result, large tool costs are incurred for each panel to be removed. Also, because it takes so long to cut out the panel with the hand-held power saws, labor costs may be high. Moreover, several such tools are typically in use (by several workmen) at the same time. Because a number of the tools must thus be available, tool costs are high. Finally, because the hand-held power saws are relatively small, and there are so many on the job site, they are an easy target for costly pilferage.

The vertical seams present a different, but nonetheless serious problem. The membranes or seams are generally cut with a torch rather than the slower sawing method. Removal of a section of tube-wall and all work associated therewith occurs from inside the boiler. As a result, in that confined area, there is a tendency for carbon to build up on the tubes. This carbon buildup near a source of intense heat such as the torch may tend to heat up excessively thereby causing the tube on which the carbon has built up to rupture, thus again necessitating time-consuming and costly repairs. Also of great concern is the added risk to the workmen represented by use of a torch.

Once the old section of the tube-wall is removed, several steps remain before the new panel can be inserted.

In order to effectuate a good weld between the new panel and the existing boiler tube-wall, the tube-ends exposed by removal of the old section must be prepared properly. The top and bottom of the new panel will have exposed tube openings which are to be matched up to the exposed tube-ends on the tube-wall. Each of the tube openings will typically have an outwardly-formed lip. After cutting out the old section, the exposed boiler tube-wall tube-ends are generally flat or horizontal and must each be milled down or chamfered to also have formed lips. Thus, when mated, full exposure to the weld area is possible.

Previously, such milling of the exposed tube-ends has been accomplished by use of hand-held milling tools. The milling tool is positioned over an exposed tube-end and actuated. Once the tube-end is properly milled, the milling tool is deactuated and removed from the exposed tube-end to be placed on the next exposed tube-end for milling. This process is repeated for each tube-end until all of them are milled appropriately. Some of the same limitations inherent in cutting the tube-wall with hand-held saws are presented by use of hand-held milling tools. Most notably, the inaccuracy of using hand-held power milling tools results in uneven milling from one exposed tube end to the next end. The exposed, chamfered tube-ends will thus not form a straight line across the top (or bottom as the case may be) of their exposed ends as is desired to match the straight line defined by the tube openings of the new panel. This non-uniformity further aggravates the time and expense of curative measures as discussed with respect to cutting the tubes.

Accordingly, it has been one objective of the present invention to provide a method for cutting a tube-wall which requires relatively few man-hours thereby reducing labor costs.

Another objective of the present invention has been to provide a method for cutting a tube-wall in which a torch need not be used.

A further objective of the present invention has been to provide a method of cutting a tube-wall with relatively few tools thereby reducing tool costs.

An even further objective of the present invention has been to provide a method of removing a section of the tube-wall and preparing exposed tube-ends resulting therefrom for insertion of a new tube-wall panel without the need for curative steps.

A yet further objective of the present invention has been to provide an apparatus for use in the method of this invention.

SUMMARY OF THE INVENTION

The method and apparatus therefor provided by the present invention achieve the above objects of the invention. Specifically, a guide is provided which can be secured directly to the tube-wall of the generator-boiler adjacent a predetermined line of cut. A power saw or milling tool may be selectively mounted to the guide. When the saw is so mounted, it is actuated and moved along the guide resulting in a straight cut along the predetermined line of cut through the tubes and intervening seams and/or along a seam. The present apparatus, when employed according to the method of the present invention permits 48 tubes and intervening seams to be cut through in as little as 30 man-minutes. As a result, fewer workers take less time to accomplish the job. Also, by virtue of employing the guide, a larger, more durable tool (and cutting disc) may be used thus reducing tool count (and costs) and the related drawbacks. Finally, because the method of the present invention permits such rapid cutting, the vertical seams may also be cut with the use of the guide thus eliminating use of the torch for cutting. By so cutting along each of the four lines of cut necessary to remove a rectangular section of tube-wall, it is possible to cut out a panel of predetermined dimension from the tube-wall accurately and with little need for curative steps before insertion of the replacement part.

After the tube-wall is removed, the power saw is replaced with a milling tool. The milling tool is intermittently moved along the guide and at each exposed tube-end actuated to mill that tube-end to the desired shape. Because of the previously-described uniform cut, the extent of milling needed on each tube-end will also be uniform. Also, by use of the guide, the milling tool will chamfer each tube-end to approximately the same depth resulting again in the exposed tube-ends defining a straight line to receive the new pre-sized tube-wall panel. Hence, again, little if any in the way of curative steps are required to properly secure the new section of tube-wall in place.

In accordance with the present invention and in its broadest aspects, there is thus provided a method of cutting a boiler tube-wall of a generating station comprised of a plurality of generally vertical, parallel tubes welded together lengthwise, the method employing a guide having a pair of parallel guide rods interposed between a pair of securement devices for selectively, removably securing the guide to the tube-wall and a mount slidably mounted on the guide rods for movably supporting an actuatable tool for movement along the guide rods between the securement devices, the method comprising the steps of:

(a) mounting a cutting tool to the mount;
(b) removably securing the guide to a first location on one vertical surface of the tube-wall, the location being defined by a first line of cut to be made in the tube-wall;
(c) actuating the cutting tool; and
(d) moving the cutting tool along the guide rods between the securement devices and along the first cut line to cut through the tube-wall and any of the tubes therealong.

Preferably, the previous steps are followed by the step of
(e) deactuating the cutting tool.

The present invention may also be employed to cut out a panel of predetermined dimensions from the tube-wall by the following further method steps:

(f) removing the guide from the tube-wall surface; and
(g) repeating each of the steps (b) through (f) for each subsequent cut line wherein the first and subsequent lines of cut substantially define therebetween the panel.

Thereafter, of course, there is the step of (h) removing the panel.

With respect to preparing the exposed section of wall for the new panel, removal of the old panel creates an opening wherein any of the tubes cut through will have exposed tube-ends. The method of the present invention further preferably provides for:

(i) replacing the cutting tool with a milling tool;
(j) removably securing the guide to one of the locations wherein any of the tube openings are exposed along a line of cut;
(k) actuating the milling tool; and
(l) intermittently moving the milling tool along the line of cut and milling each tube-end encountered therealong.

The previous steps are preferably followed by the step of
(m) deactuating the milling tool.

To prepare any other exposed tube-ends along other cut-lines, the method of the present invention further includes the steps of:

(n) removing the guide from the tube-wall;
(o) repeating each of the steps (j) through n) for each other line of cut along which tube openings have been exposed.

Once the tube-ends are prepared, the tube-wall is completed by:

(p) inserting into the opening a new panel of predetermined dimensions sized to fit therein; and
(q) welding the new panel into the opening along the seams defined along the perimeter of the new panel and adjacent portions of the tube-wall.

The apparatus particularly useful in the present invention is a guide adapted to be removably secured to a boiler tube-wall of a generating station comprised of a plurality of generally parallel, vertical tubes welded together lengthwise, wherein the guide comprises a pair of parallel guide rods, a pair of securement devices for selectively removably securing the guide to one surface of the tube-wall whereby the guide rods are interposed between the securement devices, and a slidable mount for movement along the guide rods between the securement devices. The mount is adapted to receive a tool which may be either an actuatable cutting tool or an actuatable milling tool for selectively cutting through the tube-wall, or milling exposed tube-ends, respectively.

In accordance with the principles of the present invention, it is possible to cut through 48 tubes and their intervening seams in a tube-wall in approximately one-half man-hour. Thus, an entire section of tube-wall can be removed in approximately two man-hours instead of the several tens or hundreds of man-hours previously necessary. Further, the exposed tube-ends in the tube-wall can be adequately prepared to readily receive the new panel of tube-wall to be welded therein without the use of expensive and/or time-consuming curative steps.

BRIEF DESCRIPTION OF THE DRAWINGS

These and other features and advantages of the invention will become more readily apparent from the following detailed description taken with the accompanying drawings in which.

DETAILED DESCRIPTION OF THE DRAWINGS

Figure 1:
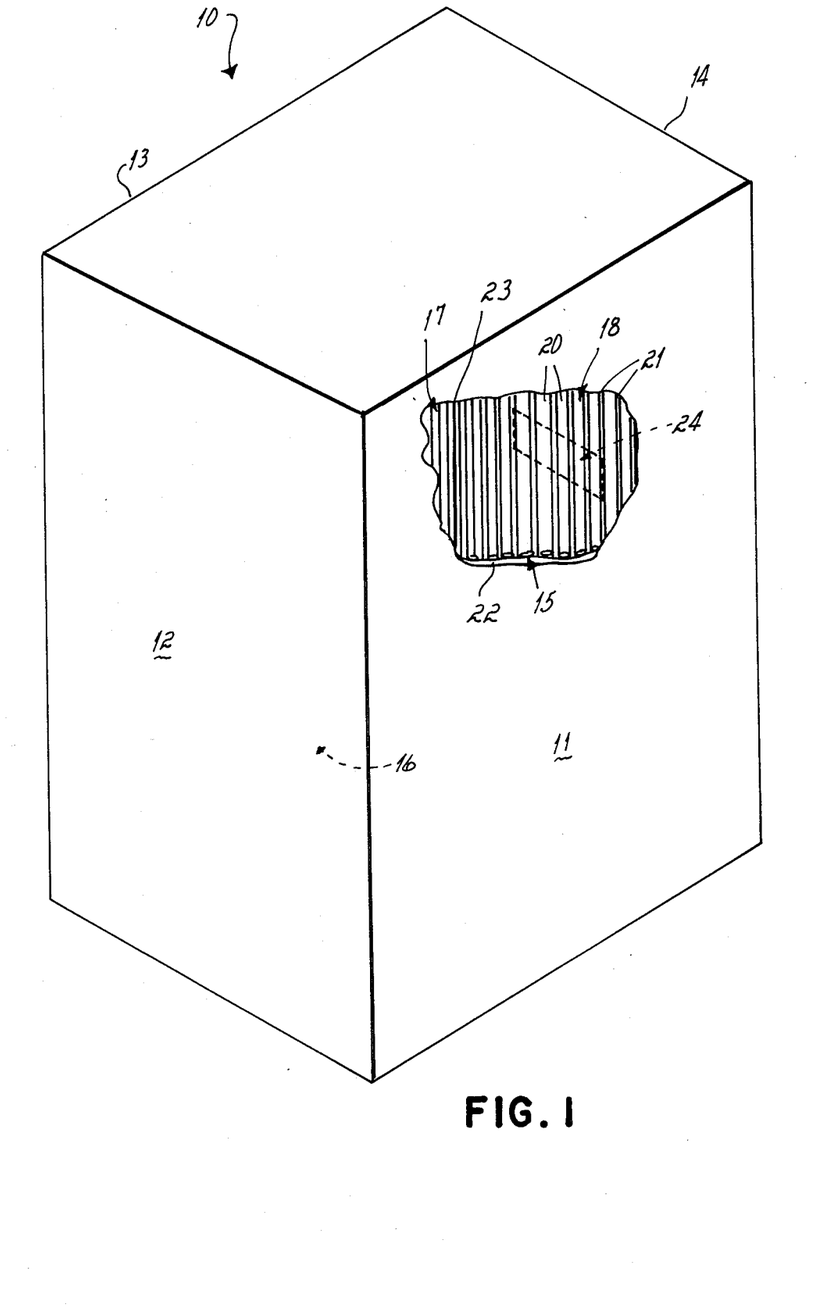
FIG. 1 is a perspective view of a generatorboiler structure with a cutout to expose portions of the interior side of two adjacent tube-walls.

With reference to FIG. 1 there is shown a structure 10 representing a generating station boiler comprised of four contiguous steel or brick walls 11 through 14. Along the interior of walls 11 through 14 are tube-walls 15 through 18 (only 17 and 18 may be seen through cutout 22). Each of tube-walls 15 through 18 is comprised of a plurality of generally vertical, parallel tubes 20 joined together with webs or seams 21 as can be seen through cutout 22 of structure 10. Each tube-wall meets an adjacent tube-wall at a corner 23 to define a generally hollow structure therein. To replace a section 24 of tube-wall of predetermined dimensions as indicated by the dotted line in FIG. 1, the apparatus of FIG. 2 may be employed in the method to be described with respect to FIGS. 5 and 6.

Figure 2:
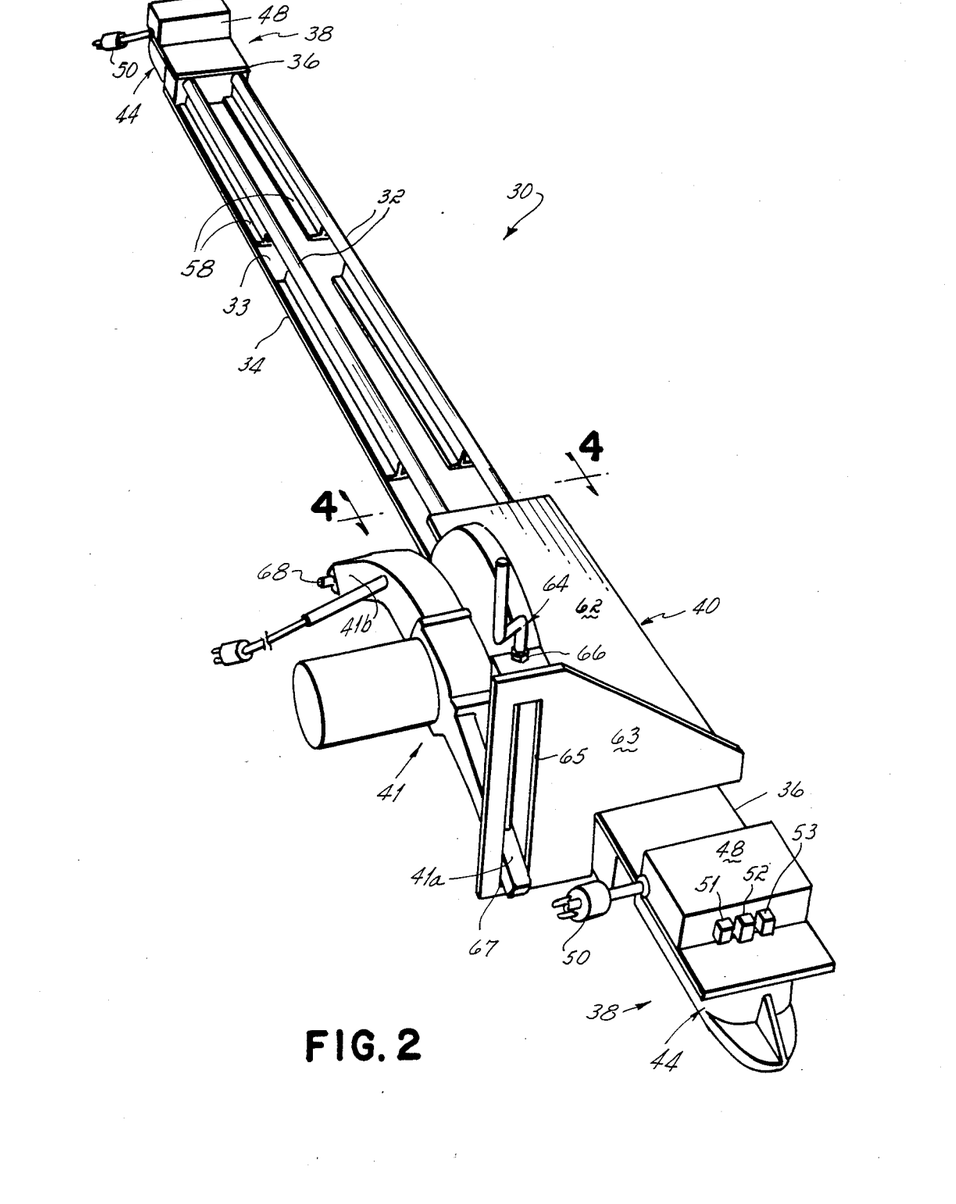
FIG. 2 is a perspective view of a guide apparatus useful in practicing the method of the present invention.
Figure 6:
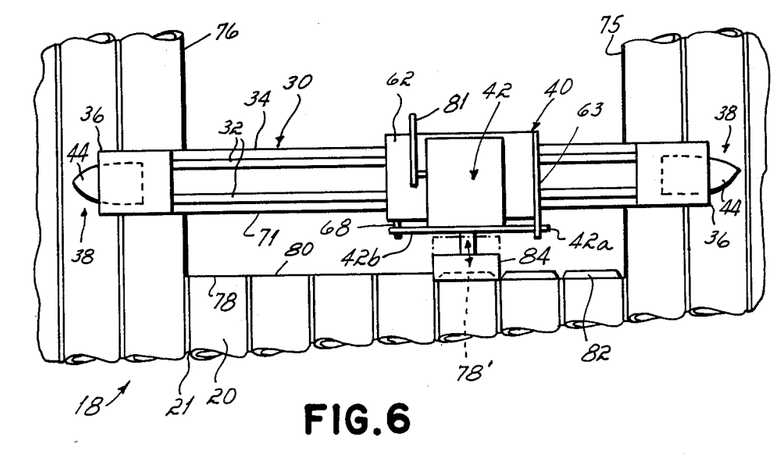
FIG. 6 is a diagrammatic view of the guide apparatus of FIG. 2 secured to one wall of the structure of FIG. 1 after a panel has been removed and the cutting tool replaced with a milling tool also for purposes of explaining the method of the present invention.

With reference to FIG. 2, there is shown a guide apparatus 30 according to the present invention having a pair of parallel guide rods 32, 32 spaced above the upper surface 33 of web 34. At opposite ends of web 34 are a pair of L-shaped web extensions 36, 36 to which are mounted a pair of securement devices 38, 38. Slidably mounted to guide rods 32, 32 is a slidable platform or mount 40 to which can be mounted a power saw 41 or a milling tool 42 (FIG. 6.).

Each securement device 38 is comprised of an electromagnetizable cast-iron shoe 44 mounted to the underside 35 of web extension 36 (FIG. 3) whereby the bottom surface 45 of each shoe 44 is spaced above a plane defined by the under surface 37 of web 34. Embedded in cavity 46 of each shoe 44 are a plurality of loops of conductive wire 46' (shown in dotted line in FIG. 3) which are employed to electromagnetically energize shoe 44 in well understood fashion. Cavity 46 is sealed with an epoxy-like substance 47 to secure conductive loops 46' within cavity 46.

Figure 3:
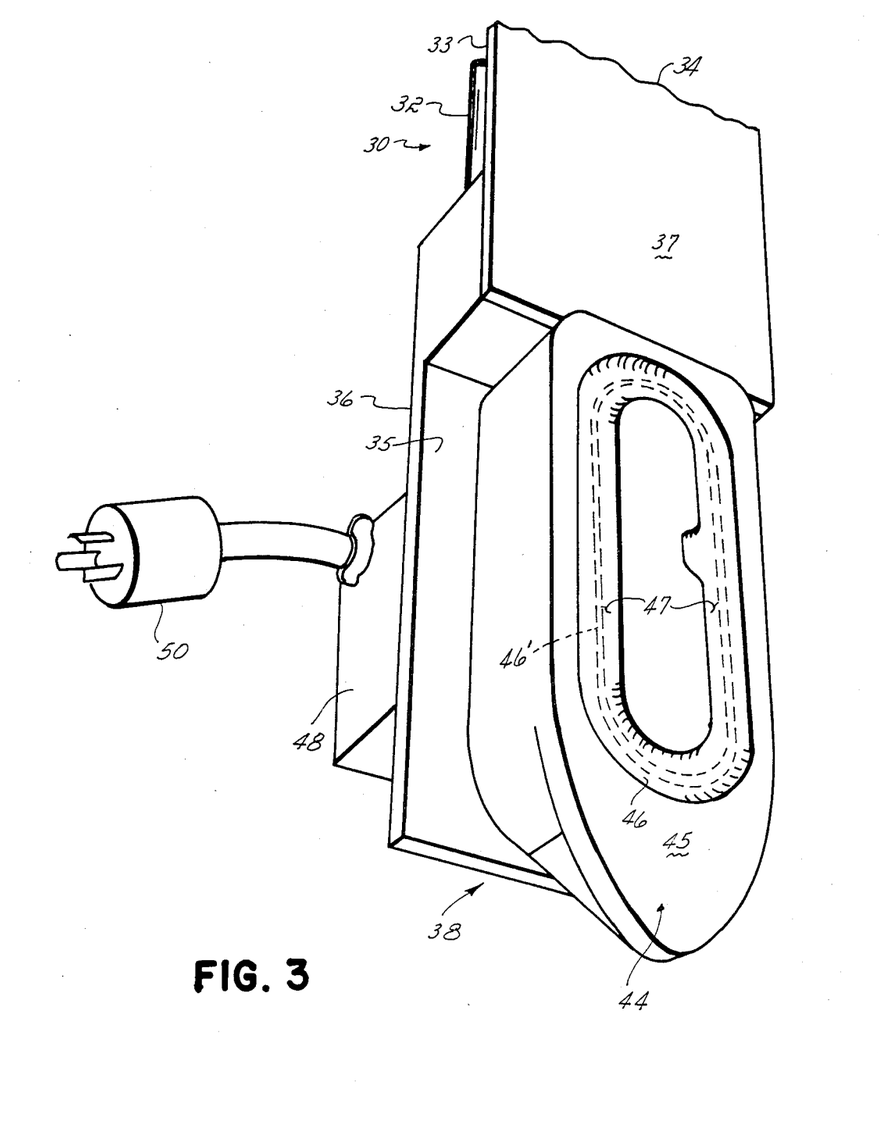
FIG. 3 is a bottom perspective view of one of the securement devices of the guide apparatus of FIG. 2.

Conductive loops 46' in cavity 46 are selectively coupled by switch box 48 to a source of electrical power (not shown) through plug 50. Switch box 48 includes three switches 51, 52 and 53, for "off", "unlocked on" and "locked on", respectively. Switches 52 and 53, when actuated or depressed, energize conductive loops 46' to cause the electromagnetic effect whereby guide 30 may be removably secured to a steel surface such as a tube-wall 18. Actuation of "off" switch 51 deenergizes conductive loops 46'.

Switches 52 and 53 are mechanical safety switches. Actuation of switch 52 energizes conductive loops 46' in cavity 46 but also permits switch 51 to be activated to deenergize the conductive loops. Actuation of switch 52 also energizes conductive loops 46' but further locks out switch 51 thereby preventing a workman from accidentally deenergizing conductive loops 46'. Hence, once switch 53 is actuated, switch 51 cannot be actuated unless and until switch 52 has been actuated.

Figure 4:
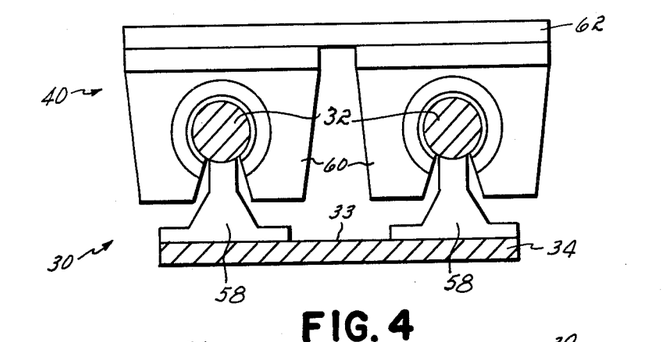
FIG. 4 is a cross-sectional view of the guide apparatus of FIG. 2 taken along line 4—4 thereof.

As shown in FIG. 4, guide rods 32 are spaced above web 34 by parallel flanges 58, 58 positioned along web 34. Slidably mounted on guide rods 32 are a pair of mounts 60, 60 to which is secured a tool bed 62. Preferably two pairs of mounts 60 are utilized, one pair each at the forward and rearward ends of tool bed 62. Mounts 60 and tool bed 62 comprise the slidable platform 40 to which can be mounted the saw 41 or milling tool 42 for purposes to be discussed.

Slidable platform 40 includes (FIG. 2) an upstanding slotted frame 63 and screw-down clamp 64 threadably received through a threaded hole (not shown) over the slot 65 as at 66. Saw 41 and/or milling tool 42 each have a rearwardly extending handle 41a, 42a, respectively, which is receivable through slot 65 and secured against the bottom 67 thereof by screw-down clamp 64. The tools also have a forward slotted post 41b, 42b of saw 41 or milling tool 42, respectively, through which is received a support rod 68 to hold the tools onto platform 40. Support rod 68 is secured to platform 40. Preferably, a clip (not shown) is removably attached to rod 68 to hold the tool in place. Once secured to slidable platform 40, the tool is movable between the securement devices 38, 38 along a line defined by guide rods 32, 32.

Figure 5:
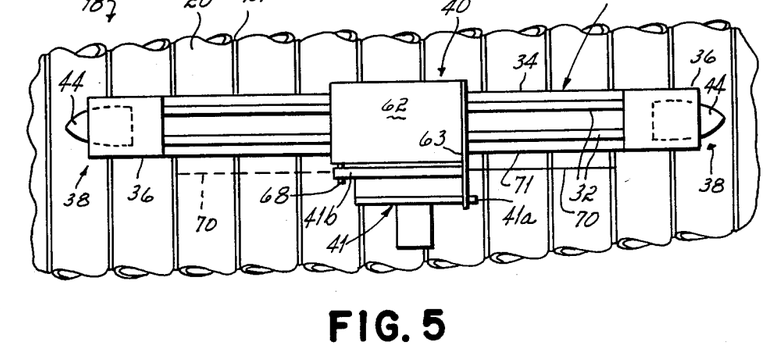
FIG. 5 is a diagrammatic view of the guide apparatus of FIG. 2 secured to one wall of the structure of FIG. 1 and having mounted thereon a cutting tool for purposes of explaining the method of the present invention.

With reference to FIG. 5, guide 30 is shown secured to a vertical surface of tube-wall 18 for purposes of explaining the method of this invention. With respect to a feature of this invention, shoes 44, 44 are preferably long enough to contact the outermost portion of at least two tubes 20 to provide a strong securement to tube-wall 18 as desired. A line of cut 70, indicated by the dotted line in FIG. 5, is shown bisecting a plurality of tubes 20 and the intervening seams 21.

Saw 41 is placed on movable platform 40 and secured thereto as previously discussed. Guide 30 is then positioned on tube-wall 18 whereby an edge 71 of web 34, which edge is parallel to the cut-line of saw 41, is positioned parallel to the line of cut 70 on tube wall 18. Once guide 30 is positioned proximate line of cut 70, securement devices 38, 38 are energized by actuation of switches 52, 52 whereby guide 30 will be removably secured to tube-wall 18 by the electromagnetic effect induced in shoes 44, 44. Thereafter, if necessary, each end of guide 30 may be moved vertically upwardly or downwardly until edge 35 is parallel to line of cut 70 and wherein the blade (not shown) of saw 41 is positioned to cut along line 70. This vertical adjustment may require alternating actuation of switches 51, 52 on each end of web 34 or tapping on web 34 with a hammer, for example, to slide each end to the appropriate position. Once properly positioned, switches 53, 53 are actuated to prevent accidental actuation of switches 51, 51.

Once guide 30 is secured to the tube-wall 18, tool 41 may be actuated and platform 40 moved along cut-line 70 causing tool 41 to cut through tubes 20 and the intervening seams 21 (as indicated by the solid portion of line 70 in FIG. 5).

Once the cut is completed along line of cut 70, tool 41 may be deactuated. Thereafter, securement devices 38, 38 may be deenergized by actuating in sequence "unlocked on" switches 52, 52 and "off" switches 51, 51. Once removed, guide 30 may be placed along subsequent lines of cut (not shown) corresponding to the periphery of panel 24 which is to be removed from structure 10. For each such line of cut, guide 30 is to be removably secured thereto as previously described, tool 41 actuated, and the desired cut made.

Preferably, four such cuts are made to define a square panel such as panel 24. Once the foregoing cuts are made, panel 24 may be removed. After removal of panel 24, there will remain exposed seam edges 75, 76 and a plurality of exposed tube-ends 78 as seen in FIG. 6 (only the bottom row being shown it being understood that there is a similar row depending from the top of structure 10 spaced above tube-ends 78). Exposed tube-ends 78 will have smooth horizontal surfaces or lips 80 which are preferably to be milled or chamfered to provide outwardly extending lips 82 to mate with the outward lips of the tube-openings of a replacement, tube-wall panel (not shown) too full access welding. To that end, the guide apparatus 30 of the present invention may be employed in accordance with a further aspect of the method of this invention.

Tool 41 is removed from platform 40 and replaced with milling tool 42. Milling tool 42 is secured to platform 40 as before described. Once milling tool 42 is secured to guide 30, guide 30 is again secured to tube-wall 18 as above-described. Again, edge 35 is to be positioned parallel to line of cut 70 which is now defined by the now exposed tube-ends 78. Edge 71 will be spaced away from exposed tube-ends 78 an amount sufficient to permit vertical movement of milling wheel 84 of milling tool 42 between a first position (dotted line) spaced above tube-end 78 and a second position (solid line) wherein tube-end 78 has been chamfered.

In operation, once guide 30 is secured, milling tool 42 is selectively moved along guide 30 until milling wheel 84 is spaced above a selected tube-end 78'. Milling tool 42 is then actuated and by downward operation of lever 81, milling wheel 84 is lowered against tube-end 78' to chamfer same. The operation of lever 81 is like that of a conventional drill press. Once tube-end 78' is milled as at 82, lever 81 is raised thereby raising milling wheel 84 above tube-end 78' whereupon milling tool 42 may be moved to the next exposed tube-end 78 for a similar milling operation. After all tube-ends 78 are milled, milling tool 42 may be deactuated and guide 30 removed from tube-wall 18.

As mentioned, FIG. 6 shows only the bottom row of exposed tube-ends 78. It should be understood, however, that a top row of exposed tube-ends (not shown) will also be present. The above-described method for milling exposed tube-ends 78 with milling tool 42 and guide 30 may be followed with respect to the top row of exposed tube-ends (not shown). To this end, guide 30 will preferably be rotated end-to-end 180° so as to bring milling wheel 84 into spaced relationship with the upper row of exposed tube-ends (not shown).

Once all the exposed tube-ends are milled and guide 30 removed, the new panel (not shown) may be emplaced. The new panel is dimensioned to match the space opened by removal of panel 24. The new panel is placed into the open space. In this position, the new panel is dimensioned to just barely fit between the upper and lower exposed tube-ends 78 with an approximately 3/32 in gap on top and bottom. The new panel is then adjusted vertically until an approximately 3/32 inch gap is formed between each tube-opening and associated tube-end whereupon the panel is welded into place. Welding is provided at the seams defined about the perimeter of the new panel and adjacent portions of the tube-wall 18 such as between tube-ends 78 and the mating tube openings of the new panel and between seam edges 75, 76 and mating seam edges (not shown) of the new panel.

In many applications, power is available for driving saw 41, milling tool 42 and to power securement devices 38, 38. Saw 41 and/or milling tool 42 are either electrically powered or they may be air driven, the latter being preferable for saw 41. A saw useful in this invention is a TOPCAT saw available from TC Service, Cleveland, Ohio. Because the saw operates at very high revolutions per minute as is preferable to advantageously cut the steel tubes and seams, the preferred blade to be used therewith is a SAIT blade available from United Adhesive Co.

As the securement devices 38, 38 as herein described are electrically powered, in those situations where electrical power is not readily available, guide 30 may alternatively be secured to the tube-wall such as by clamps welded to the tube-wall and to web extensions 36, 36. Other variations may also be possible to provide securement devices to guide 30. In any situation, however, it is preferable that web 34 be long enough to span the intended line of cut 70 and that securement devices 38, 38 thus be outside thereof.

As an added safety feature, anchoring clips (not shown) may be welded to tube-wall 18 above each securement device 38, 38. The anchoring clips may be releasably attached to mating loops (not shown) which may be threadably received in web extensions 36, 36. By use of the clips and loop, guide 30 will be loosely held to tube-wall 18 so that in the event power to the securement devices fails, the guide 30 will not fall causing injury or incurring damage.

Having described the invention, what is claimed is:

1. A method of cutting a boiler tube-wall of a power generating station comprised of a plurality of generally parallel, vertical tubes welded together lengthwise, said method employing a guide having at least one guide rod interposed between a pair of securement means for selectively, removably securing said guide to said tube-wall and actuatable cutting means slidably mounted for movement along said guide rod between said securement means for selectively cutting through said tube-wall, said method comprising the steps of:
   (a) removably securing said guide to a location on one vertical surface of said tube-wall by cooperation of only said securement means and said one vertical surface, said location being defined by a line of cut to be made in said tube-wall;
   (b) actuating said cutting means;
   (c) moving said cutting means along said guide rod between said securement means and along said line of cut to cut through said tube-wall and any of said tubes therealong.

2. The method of claim 1 further comprising the step of:
   (d) deactuating said cutting means.

3. The method of claim 1 further comprising the step of:
   (e) removing said guide from said tube-wall surface.

4. The method of claim 2 further comprising the step of:
   (e) removing said guide from said tube-wall surface.

5. A method of cutting out a panel of predetermined dimensions from a boiler tube-wall of a power generating station comprised of a plurality of generally parallel, vertical tubes welded together lengthwise, said method employing a guide having at least one guide rod interposed between a pair of securement means for selectively, removably securing said guide to said tube-wall and actuatable cutting means slidably mounted for movement along said guide rod between said securement means for selectively cutting through said tube-wall, said method comprising the steps of:
   (a) removably securing said guide to a first location on one vertical surface of said tube-wall by cooperation of only said securement means and said one vertical surface, said location being defined by a first line of cut to be made in said tube-wall;
   (b) actuating said cutting means;
   (c) moving said cutting means along said guide rod between said securement means and along said first line of cut to cut through said tube-wall and any of said tubes therealong;
   (d) deactuating said cutting means;
   (e) removing said guide from said tube-wall surface;
   (f) repeating each of said steps (a) through (e) for each subsequent line of cut wherein said first and subsequent lines of cut substantially define therebetween said panel.

6. The method of claim 5 further comprising the step of:
   (g) removing said panel.

7. A method of cutting a section of predetermined dimensions from a boiler tube-wall of a power generating station to receive therein a new tube-wall panel of approximately the same said predetermined dimensions, the tube-wall and new panel each comprised of a plurality of generally parallel tubes welded together lengthwise, said tube-wall tubes being generally vertical, said method employing a guide having at least one guide rod interposed between a pair of securement means for selectively, removably securing said guide to said tube-wall and further including slidable mounting means adapted to removably receive a tool therein for moving said tool along said guide rod between said securement means, said method comprising the steps of:
   (a) removably securing to said mounting means a first tool having actuatably cutting means for selectively cutting through said tube-wall;
   (b) removably securing said guide to a first location on one vertical surface of said tube-wall by cooperation of only said securement means and said one vertical surface, said first location being defined by a first line of cut to be made in said tube-wall;
   (c) actuating said cutting means;
   (d) moving said cutting means along said guide rod between said securement means and along said first line of cut to cut through said tube-wall and any of said tubes theralong.

8. The method of claim 7 further comprising the step of:
   (e) deactuating said cutting means.

9. The method of claim 8 further comprising the step of:
   (f) removing said guide from said tube-wall.

10. The method of claim 9, further comprising the step of:
    (g) repeating each of said steps (b) through (f) for each subsequent line of cut wherein said first and subsequent lines of cut substantially define therebetween said section.

11. The method of claim 10, further comprising the step of:
    (h) removing said section from said tube-wall whereby an opening is created and any of said tubes cut through will have exposed tube-ends.

12. The method of claim 11 further comprising the steps of:
    (i) removing said cutting means from said mounting means;
    (j) removably securing to said mounting means a second tool having an actuatable milling means for selectively milling said exposed tube-ends;
    (k) removably securing said guide to one of said locations wherein any of said tube-ends are exposed along a said line of cut;
    (l) actuating said milling means;
    (m) intermittently moving said milling means along said one line of cut and selectively milling each said exposed tube-end encountered therealong.

13. The method of claim 12 further comprising the step of:
    (n) deactuating said milling means.

14. The method of claim 13 further comprising the steps of:
    (o) removing said guide from said tube-wall;
    (p) repeating each of said steps (k) through (o) for each other said line of cut along which tube-ends have been exposed as aforesaid.

15. The method of claim 14 further comprising the step of:
    (q) inserting into said opening said new panel.

16. The method of claim 15 further comprising the step of:
    (r) welding said new panel into said opening along the seams defined along the perimeter of said new panel and adjacent portions of said tube-wall.

17. A method of cutting a boiler tube-wall of a power generating station comprised of a plurality of generally parallel, vertical metal tubes welded together lengthwise, said method employing a guide having at least one guide rod interposed between a pair of electromagnetizable securement means for selectively, removably electromagnetically securing said guide to said tube-wall and actuatable cutting means slidably mounted for movement along said guide rod between said securement means for selectively cutting through said tube-wall, said method comprising the steps of:
- (a) removably, electromagnetically securing said guide to a location on one vertical surface of said tube-wall by cooperation of only said securement means and said one vertical surface, said location being defined by a line of cut to be made in said tube-wall;
- (b) actuating said cutting means;
- (c) moving said cutting means along said guide rod between said securement means and along said line o cut to cut through said tube-wall and any of said tubes therealong.

18. The method of claim 17 further comprising the step of:
- (d) deactuating said cutting means.

19. The method of claim 18 further comprising the step of:
- (e) removing said guide from said tube-wall surface.

20. The method of claim 17 further comprising the step of:
- (d) removing said guide from said tube-wall surface.

21. A method of cutting out a panel of predetermined dimensions from a boiler tube-wall of a power generating station comprised of a plurality of generally parallel, vertical metal tubes welded together lengthwise, said method employing a guide having at least one guide rod interposed between a pair of electromagnetizable securement means for selectively, removably, electromagnetically securing said guide to said tube-wall and actuatable cutting means slidably mounted for movement along said guide rod for selectively cutting through said tube-wall, said method comprising the steps of:
- (a) removably, electromagnetically securing said guide to a first location on one vertical surface of said tube-wall by cooperation of only said securement means and said one vertical surface, said location being defined by a first line of cut to be made in said tube-wall;
- (b) actuating said cutting means;
- (c) moving said cutting means along said guide rod between said securement means and along said first line of cut to cut through said tube-wall and any of said tubes therealong;
- (d) deactuating said cutting means;
- (e) removing said guide from said tube-wall surface;
- (f) repeating each of said steps(a) through(e) for each subsequent line of cut wherein said first and subsequent lines of cut substantially define therebetween said panel.

22. The method of claim 21 further comprising the step of:
- (g) removing said panel.

23. A method of cutting a section of predetermined dimensions from a boiler tube-wall of a power generating station to receive therein a new tube-wall panel of approximately the same said predetermined dimensions, the tube-wall and new panel each comprised of a plurality of generally parallel metal tubes welded together lengthwise, said tube-wall tubes being generally vertical, said method employing a guide having at least one guide rod interposed between a pair of electromagnetic securement means for selectively, removably, electromagnetically securing said guide to said tube-wall and further including slidably mounting means adapted to removably receive a tool thereon for moving said tool along said guide rod between said securement means, said method comprising the steps of:
- (a) removably securing to said mounting means a first tool having actuatable cutting means for selectively cutting through said tube-wall;
- (b) removably, electromagnetically securing said guide to a first location on one vertical surface of said tube-wall by cooperation of only said securement means and said one vertical surface, said first location being defined by first line of cut to be made in said tube-wall;
- (c) actuating said cutting means;
- (d) moving said cutting means along said guide rod between said securement means and along said first line of cut to cut through said tube-wall and any of said tubes therealong.

24. The method of claim 23 further comprising the step of:
- (e) deactuating said cutting means.

25. The method of claim 24 further comprising the step of:
- (f) removing said guide from said tube-wall.

26. The method of claim 25, further comprising the step of:
- (g) repeating each of said steps (b) through (f) for each subsequent line of cut wherein said first and subsequent lines of cut substantially define therebetween said section.

27. The method of claim 26, further comprising the step of:
- (h) removing said section from said tube-wall whereby an opening is created and any of said tubes cut through will have exposed tube-ends.

28. The method of claim 27 further comprising the steps of:
- (i) removing said cutting means from said mounting means;
- (j) removably securing to said mounting means a second tool having an actuatable milling means for selectively milling said exposed tube-ends;
- (k) removably, electromagnetically securing said guide to one of said locations wherein any of said tube-ends are exposed along a said line of cut;
- (l) actuating said milling means;
- (m) intermittently moving said milling means along said one line of cut and selectively milling each said exposed tube-end encountered therealong.

29. The method of claim 28 further comprising the step of:
- (n) deactuating said milling means.

30. The method of claim 29 further comprising the steps of:
- (o) removing said guide from said tube-wall;
- (p) repeating each of said steps (k) through (o) for each other said line of cut along which tube-ends have been exposed as aforesaid.

31. The method of claim 30 further comprising the step of:
- (q) inserting into said opening said new panel.

32. The method of claim 31 further comprising the step of:
- (r) welding said new panel into said opening along the seams defined along the perimeter of said new panel and adjacent portions of said tube-wall.

* * * * *